May 23, 1950
H. F. MAYER
2,509,007
PULSE ECHO SYSTEM
Filed Feb. 13, 1946
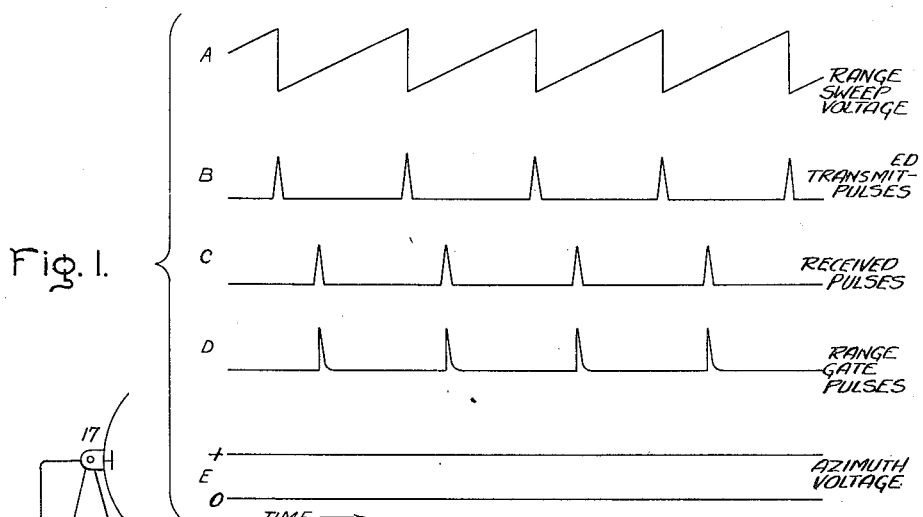
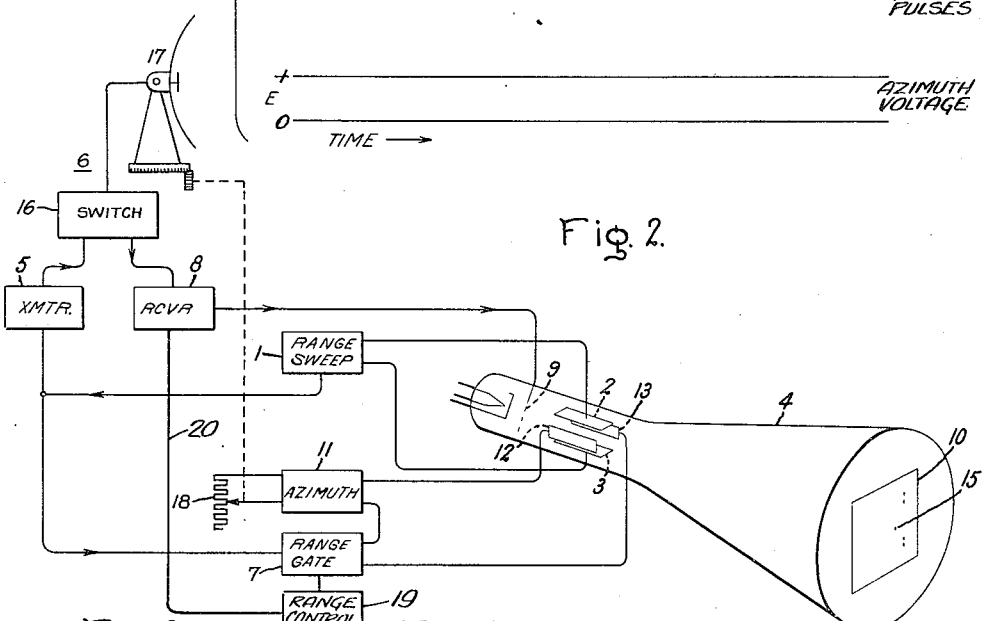
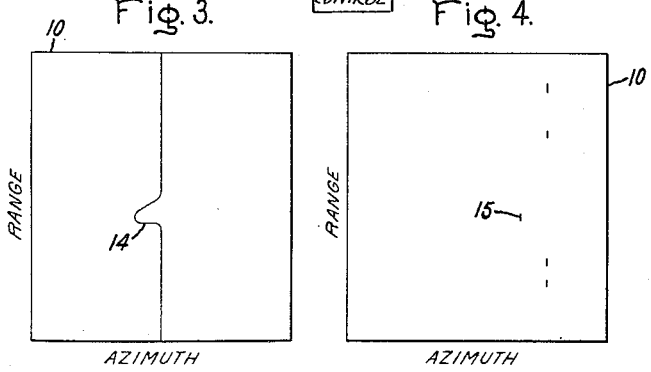
Inventor:
Harry F. Mayer,
by Merton D. Morse
His Attorney.

Patented May 23, 1950

2,509,007

UNITED STATES PATENT OFFICE 2,509,007

PULSE ECHO SYSTEM

Harry F. Mayer, Schenectady, N. Y., assignor to General Electric Company, a corporation of New York Application February 13, 1946, Serial No. 647,272

4 Claims. (Cl. 343—11)

My invention relates to pulse echo systems and more particularly to such systems adapted to determine the distance or range of remote objects.

In one type of pulse echo system the distance to a remote object is indicated by the position of a luminous point on a cathode ray tube screen along one axis generally designated as the "range" axis and the azimuth of the remote object indicated by the position of the same luminous point along an axis normal to the first axis generally designated as the "azimuth" axis. Accurate measurement of distance is provided by a series of voltage pulses, known as "gate" pulses, generated within the system and accurately delayed with respect to transmitted energy pulses. In one method of measuring the distance to a remote object the "gate" pulses are shown as a luminous spot on the cathode ray tube screen at points along the range axis corresponding to their time delay. This luminous spot may be moved to coincidence with a luminous spot produced by pulses received from a remote object and the range of that object determined by observing the time delay of the "gate" pulses. In some pulse echo systems, the luminous spot corresponding to the "gate" pulses is automatically placed in coincidence with the spot corresponding to a remote object and held in that position despite relative motion of the object and the pulse echo equipment. Hence, a single spot is seen on the screen corresponding to the combination of the locally generated "gate" pulses and the received signal pulses.

It is an object of my invention to provide an improved method of producing the luminous spot indication on a cathode ray tube screen due to a remote object having distance corresponding to the time delay of the "gate" pulses of a pulse echo system.

It is a further object of my invention to provide means of indicating the particular luminous spot on a cathode ray tube screen due to a remote object having distance corresponding to the time delay automatically maintained by the "gate" pulses of a pulse echo system.

In addition, it is an object of my invention to provide a means of indicating the luminous point on the cathode ray tube screen of a pulse echo system due to a remote object having distance corresponding to the time delay of the "gate" pulses in a manner which may be observed by the operator with a minimum degree of confusion.

Briefly, my invention resides in causing the "gate" pulses of a pulse echo system to be shown as a deflection along the azimuth axis of the cathode ray tube screen rather than as a luminous point thereon. When the pulse echo system is pointed in a specific direction, the remote objects shown on the cathode ray tube screen appear as a single line of luminous points. However, the object having distance corresponding to the time delay of the "gate" pulses is displaced along the azimuth axis and may readily be distinguished from all others. This performance may be accomplished in a cathode ray tube having electrostatic deflection by adding voltage, corresponding to the "gating" pulses, to the voltage applied to the azimuth deflecting plates.

As is well-known in the pulse echo art, the received pulses may either be direct reflections, i. e. echoes, of the transmitted pulses from a remote object, or they may be pulses re-radiated in response to the incident transmitted pulses by apparatus at the remote object. Therefore, where the received pulse is described in the following specification and claims as a "reflected" or "echo" pulse, or where the remote object is described as a "reflecting" object, it is to be understood that either of these methods of re-radiation is included.

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which Fig. 1 is a diagram indicating the various signal pulses within the radar system; Fig. 2 illustrates an embodiment of my invention and Figs. 3 and 4 show the appearance of the cathode ray tube screen under various conditions of operation.

In Fig. 1 the various signals within the radar system are shown on a single time scale. Sweep voltage A consists of a series of saw tooth waves which are used to deflect the ray of a cathode ray device along the range or vertical axis. Curve B shows the signal pulses from the transmitter corresponding to the sweep of curve A, each pulse taking place at the instant voltage A starts from zero. Curve C shows the received pulse signals, due to reflected or reply energy, from a remote object the distance of which is desired to be measured. These signals correspond with the transmitted signals but are delayed therefrom by a time corresponding with the distance to the remote object. Curve D shows the range "gate" pulses which, for the particular case illustrated, correspond in time with the received pulses. In addition to these signals a further voltage is applied to indicate the azimuth of maximum radiation from the antenna in a manner described in further detail hereafter. For the case of the antenna at rest, this voltage is a constant voltage as shown in curve E, Fig. 1.

The operation of my invention may be understood from the embodiment shown in Fig. 2. In the figure, a range sweep system 1 is illustrated, which provides a saw tooth voltage wave between vertical or range axis deflection plates 2 and 3 of cathode ray tube 4. This voltage causes the cathode ray beam to traverse the screen area successively along the vertical or range axis with substantially constant velocity. The wave shape of signals generated in the range sweep system corresponds to that shown in curve A, Fig. 1. Transmitter 5 produces an energy pulse each time range sweep system 1 causes the cathode ray beam to move across the screen. These pulses correspond in time with those shown in curve B, Fig. 1, and are applied to an antenna system, generally shown at 6. Range "gate" system 7 produces, as shown in curve D, Fig. 1, delayed voltage pulses in response to the transmitted signal, these pulses being delayed by a time corresponding to the adjustment of the range "gate" system. Reflected or reply pulses from remote objects appear at antenna system 6 and are applied to receiving system 8 which converts them to pulses of unidirectional electromotive force, as shown in curve C, Fig. 1, and applies them between control electrode 9 and the cathode of cathode ray tube 4, thereby intensifying the cathode ray beam and producing a luminous spot on screen 10 at the instant the pulses arrive. The voltage from range sweep system 1 causes these spots to appear at a position along the vertical or range axis corresponding to the distance of the remote object causing the pulses.

In accordance with known practice, the range gate 7 may be manually controlled to adjust the time position of the range gate pulses, or as previously pointed out, these pulses may be automatically maintained in coincidence with the received pulses. Various range tracking systems for accomplishing this adjustment are known to the art. Therefore, the range gate 7 is indicated only schematically as being controlled by range control 19. For automatic range tracking, the range control 19 is controlled by pulses from receiver 8 supplied over the conductor 20. For further details of a suitable range tracking system providing either manual or automatic positioning of range gate pulses and accurate measurement of the corresponding ranges, reference may be made to the copending application Ser. No. 400,080 of William C. Hahn, filed June 27, 1941, and assigned to the same assignee as the present invention. Another suitable range tracking system of this type is also fully disclosed in Patent 2,467,208—Hahn, issued April 12, 1949, which patent is a continuation-in-part of Serial No. 400,080.

The antenna system, generally shown as 6, consists of two components, switch 16 and directional radiating portion 17. Switch 16 couples signals from transmitter 5 to radiating portion 17 while at the same time permitting received signals from radiating portion 17 to pass to receiver 8. The radiating portion 17 comprises a directive antenna which projects a beam of energy along a narrow axis in the azimuth direction, the position of the axis depending on the position of structure 17. Gears or similar means are connected to radiating structure 17 to operate variable resistance 18 so that the resistance value corresponds to the azimuth direction of maximum radiated power. The resistance of variable resistance 18 is converted to a voltage in azimuth unit 11 so that the output voltage of this unit represents the direction radiating portion 17 is pointed, or oriented. When radiating portion 17 is stationary, this voltage is constant as shown in curve E, Fig. 1.

The total voltage output from azimuth system 11 and range "gate" 7 is applied to the horizontal or azimuth deflecting plates 12 and 13 of cathode ray device 4. The horizontal deflection of the cathode ray beam, and consequently, the position of images on the tube screen then corresponds to the sum of these two voltages.

Fig. 3 shows the appearance of the cathode ray tube screen with radiator 17 stationary when the beam intensity is increased above normal and no signals are being received. The cathode ray beam then has a uniform intensity and produces a luminous line over the length of the screen, the position of the line corresponding to the adjustment of antenna 6. However, at one point 14 the line sharply deflects to the left, this deflection corresponding to the signal from the range "gate" system which adds a delayed voltage pulse to the constant voltage of Fig. 1, curve E. In actual operation, however, only a relatively small number of remote objects will lie in the field of the antenna and the cathode ray tube screen will display only a small number of luminous spots as shown in Fig. 4. It is evident from the figure that the line shown in Fig. 3 disappears and the only luminous spots on the screen correspond to received pulses from remote objects. These signals lie on a single vertical line corresponding to that shown in Fig. 3 with the exception of one signal 15 which is displaced to the left by the range "gate" signal.

It is evident from Fig. 4 that luminous point 15 is the point corresponding to the range "gate" pulses. If the exact range of the remote object causing this spot is desired, the range "gate" pulse is adjusted either manually or automatically, by operation of range control 19, to show point 15 at a maximum displacement to the left, it being always apparent that the distance to the remote object causing spot 15 and no other is being measured. If the pulse echo system is equipped with an automatic range system, it is obvious from inspection of the cathode ray tube screen that luminous point 15 corresponds to the remote object whose distance is being measured and that other points are not being utilized in the automatic measuring system. This enables the operator to select readily the luminous point corresponding to the remote object whose distance is automatically being measured and prevents any possible confusion relative to the exact position of the range "gate" pulse on the cathode ray tube screen.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In a pulse echo system, a directive wave emitting device, a transmitter arranged to supply recurrent energy pulses to said device to be emitted thereby, a cathode ray device having a viewing screen, a receiver responsive to energy pulses from remote objects in the path of energy from said emitting device, first means to vary the intensity of the electron ray of said cathode ray device in accordance with pulses received at said receiver, second means to deflect said ray in one direction across said screen during a predetermined interval after each energy pulse from said emitting device, third means to produce voltage pulses corresponding to said first pulses but delayed thereafter by a predetermined time interval, fourth means to produce a voltage corresponding to the orientation of said emitting device, and fifth means to deflect said ray in a direction at right angles to said first deflection in accordance with the total voltage of said third and fourth means, whereby pulses received from remote objects during pulses produced by said third means are indicated on said screen at a point out of alignment with the indications produced by pulses received from other remote objects.

2. In a pulse echo system, a directive wave emitting device, a transmitter arranged to supply recurrent energy pulses to said device to be emitted thereby, a cathode ray device having a viewing screen, a receiver responsive to energy pulses from remote objects in the path of energy from said emitting device, first means to vary the intensity of the electron ray of said cathode ray device in accordance with pulses received at said receiver, second means to deflect said ray in one direction across said screen during a predetermined interval after each energy pulse from said emitting device, third means to produce voltage pulses corresponding to said energy pulses from said emitting device but delayed thereafter by a predetermined time interval, fourth means to produce a voltage corresponding to the orientation of said emitting device, fifth means to deflect said ray in a direction at right angles to said first deflection in accordance with the total voltage of said third and fourth means, whereby pulses received from remote objects during pulses produced by said third means are indicated on said screen at a point out of alignment with the indications produced by pulses received from other remote objects, and sixth means responsive to selected energy pulses at said receiver corresponding to a particular remote object for controlling said third means to maintain said voltage pulses continuously in correspondence with said selected energy pulses.

3. In a pulse echo system, a wave emitting device, a transmitter arranged to supply recurrent energy pulses to said device to be emitted thereby, a cathode ray device having a viewing screen, a directive energy receiver responsive to energy pulses from objects in a particular portion of the path of energy from said emitting device, first means to vary the intensity of the electron ray of said cathode ray device in accordance with pulses at said receiver, second means to deflect said ray in one direction across said screen during a predetermined interval after each energy pulse from said emitting device, third means to produce voltage pulses corresponding to said first energy pulses but delayed thereafter by a predetermined time interval, fourth means to produce a voltage corresponding to the orientation of said receiving device, and fifth means to deflect said ray in a direction normal to said first deflection in accordance with the total voltage of said third and fourth means, whereby pulses received from remote objects during pulses produced by said third means are indicated on said screen at a point out of alignment with the indication produced by pulses received from other remote objects.

4. The method of measuring the range of an energy reflecting object characterized by the steps of transmitting a series of directional energy pulses, deflecting a ray beam in one direction in synchronism with said transmitted pulses, changing the intensity of said beam when a reflected pulse is received, generating voltage pulses delayed from said transmitted pulses by a predetermined time, generating a voltage corresponding to the direction of maximum energy of said transmitted pulses, and deflecting said ray beam in a direction at right angles to said first deflection in accordance with the total voltage of said voltage pulses and said voltage, whereby received signals corresponding in delay to said last pulses are shown in a displaced position with respect to other received signals.

HARRY F. MAYER.

REFERENCES CITED

The following references are of record in the file of this patent:

UNITED STATES PATENTS

| Number | Name | Date |
|---|---|---|
| 2,415,981 | Wolff | Feb. 18, 1947 |
| 2,416,088 | Deerhake | Feb. 18, 1947 |
| 2,419,205 | Feldman | Apr. 22, 1947 |
| 2,419,239 | White | Apr. 22, 1947 |
| 2,422,361 | Miller | June 17, 1947 |